US012637378B2

(12) United States Patent
Kuhlman et al.

(10) Patent No.: US 12,637,378 B2
(45) Date of Patent: May 26, 2026

(54) GLASS BATCH INLET AND CLEANING DEVICE

(71) Applicant: Owens-Brockway Glass Container Inc., Perrysburg, OH (US)

(72) Inventors: Robert Kuhlman, Dundee, MI (US); Shane Rashley, Bowling Green, OH (US)

(73) Assignee: Owens-Brockway Glass Container Inc., Perrysburg, OH (US)

(*) Notice: Subject to any disclaimer, the term of this patent is extended or adjusted under 35 U.S.C. 154(b) by 177 days.

(21) Appl. No.: 18/464,358

(22) Filed: Sep. 11, 2023

(65) Prior Publication Data

US 2024/0409447 A1 Dec. 12, 2024

Related U.S. Application Data

(60) Provisional application No. 63/507,589, filed on Jun. 12, 2023.

(51) Int. Cl.
*C03B 3/00* (2006.01)
*F27D 25/00* (2010.01)

(52) U.S. Cl.
CPC .............. *C03B 3/00* (2013.01); *F27D 25/001* (2013.01)

(58) Field of Classification Search
None
See application file for complete search history.

(56) References Cited

U.S. PATENT DOCUMENTS

| | | | |
|---|---|---|---|
| 1,761,229 | A | 6/1930 | Pederson |
| 1,977,300 | A | 10/1934 | Blunt |
| 3,850,606 | A | 11/1974 | Rough |
| 3,951,635 | A | 4/1976 | Rough, Sr. |
| 5,135,169 | A | 8/1992 | Mensink |
| 6,047,566 | A | 4/2000 | Fleckenstein et al. |
| 6,797,229 | B2 | 9/2004 | Saarinen et al. |
| 7,010,940 | B2 | 3/2006 | Ogino et al. |
| 7,730,744 | B2 | 6/2010 | Ogino et al. |
| 7,926,301 | B2 | 4/2011 | Johnson |
| 8,440,134 | B2 | 5/2013 | Rosner et al. |
| 8,919,265 | B2 | 12/2014 | Offutt |
| 8,978,419 | B2 | 3/2015 | DeAngelis et al. |
| 9,062,917 | B2 | 6/2015 | Offutt |

(Continued)

FOREIGN PATENT DOCUMENTS

| | | | |
|---|---|---|---|
| FR | 2687592 | A1 | 8/1993 |
| JP | H01122930 | A | 5/1989 |

(Continued)

OTHER PUBLICATIONS

PCT Search Report and Written Opinion, Int. Application No. PCT/US2024/032665, Applicant; Owens-Brockway Glass Container Inc, Dated: Sep. 9, 2024.

*Primary Examiner* — Lisa L Herring

(57) ABSTRACT

A glass batch inlet and cleaning device includes an outer tubular housing including a side inlet and an inner tubular chopper slidable within the outer tubular housing. The device also includes a cover on the outer tubular housing and an actuator carried by the cover and coupled to the inner tubular chopper to move the chopper with respect to the outer tubular housing. The actuator may be carried by the cover on top of the outer tubular housing. A method of using the device is also disclosed.

16 Claims, 6 Drawing Sheets

(56)                    References Cited

U.S. PATENT DOCUMENTS

| | | |
|---|---|---|
| 9,086,242 B2 | 7/2015 | Newman, Jr. |
| 9,394,192 B2 | 7/2016 | DeGalhau et al. |
| 9,643,869 B2 | 5/2017 | Shock et al. |
| 10,101,090 B2 | 10/2018 | Gunner et al. |
| 10,119,763 B2 | 11/2018 | Yu |
| 10,793,460 B2 | 10/2020 | Hu et al. |
| 11,084,749 B2 | 8/2021 | Rashley et al. |
| 2011/0236846 A1 | 9/2011 | Rue et al. |
| 2016/0348972 A1* | 12/2016 | Yu ......................... F27D 3/0025 |
| 2017/0022083 A1 | 1/2017 | Huber et al. |
| 2017/0073262 A1 | 3/2017 | Charbonneau et al. |
| 2020/0156978 A1* | 5/2020 | Rashley ................... C03B 3/00 |
| 2020/0309456 A1 | 10/2020 | Da Costa et al. |
| 2022/0098076 A1 | 3/2022 | Holmes et al. |
| 2022/0332622 A1 | 10/2022 | Shi |

FOREIGN PATENT DOCUMENTS

| | | | |
|---|---|---|---|
| WO | 2018017270 | A1 | 1/2018 |
| WO | 2022268321 | A1 | 12/2022 |

* cited by examiner

GLASS BATCH INLET AND CLEANING DEVICE

TECHNICAL FIELD

This patent application discloses innovations related to glass manufacturing and, more particularly, to delivering glass batch into a glass melter.

BACKGROUND

A submerged combustion melter (SCM) designed for glass manufacturing typically has a roof or sidewall with an inlet for receiving glassmaking materials ("glass batch") from a glass batch charger, as well as one or more submerged burners that discharge combustion products directly into a glass melt contained within the melter. To provide the melter with on/off capability, the sidewalls and sometimes the roof of the melter may be constructed of liquid cooled panels, especially since the glass melt is maintained at a relatively high temperature on the order of 1000° C. to 2000° C. During operation of the melter, and in contrast to a conventional glass furnace, a solidified layer of glass is formed on interior surfaces of the liquid cooled panels, which protects the furnace from erosion and corrosion caused by the turbulent molten glass inside the SCM. However, the turbulent molten glass may also splash around and into the inlet and, once there, can possibly solidify within and at least partially block the inlet. Any such full or partial blockage of the inlet may in turn impede the delivery of the glass batch into the melter.

SUMMARY OF THE DISCLOSURE

The present disclosure embodies a number of aspects that can be implemented separately from or in combination with each other.

In accordance with an aspect of the disclosure, there is provided a glass batch inlet and cleaning device that includes an outer tubular housing including a side inlet, an inner tubular chopper slidable within the outer tubular housing, a cover on the outer tubular housing, and an actuator carried by the cover and coupled to the inner tubular chopper to move the chopper with respect to the outer tubular housing.

In accordance with another aspect of the disclosure, there is provided a glass batch inlet and cleaning device that includes an outer tubular housing extending from an upper end to a lower end and including a side inlet, the lower end of the housing defining an outlet, and an inner tubular chopper including a side inlet relief in registration with the side inlet of the outer tubular housing. The device also includes a cover coupled to the upper end of the outer tubular housing opposite of the outlet, and an actuator carried by the cover and coupled to the inner tubular chopper to move the chopper with respect to the outer tubular housing.

In accordance with a further aspect of the disclosure, there is provided a method of using a glass batch inlet and cleaning device. One step of the method includes providing a glass batch inlet and cleaning device that includes an outer tubular housing that defines an interior and an outlet from the device and that further includes a side inlet. The glass batch and cleaning device also includes a chopper slidable within the outer tubular housing. Another step of the method includes passing glass batch through the glass batch inlet and cleaning device and into a glass melter. In so doing, the glass batch is introduced into the interior of the outer tubular housing through the side inlet and is then passed through the interior and out of the outlet of the housing and into the glass melter through an inlet of the glass melter. Yet another step of the method includes activating a actuator to centrally actuate inner tubular chopper from a raised position, in which a chopping end of the inner tubular chopper is within the outer tubular housing, to a lowered position, in which the chopping end extends out of the outer tubular housing and beyond the outlet.

DETAILED DESCRIPTION

In general, a glass batch inlet and cleaning device is described below with reference to its use between a glass batch charger and a glass melter. The device includes an inlet that receives glass batch from the charger and an outlet that transmits the glass batch into the melter, and is configured to clear solidified or frozen glass from the outlet. Prior batch inlet and cleaning devices have been implemented and work satisfactorily, but those devices have multiple side-mounted actuators that may lead to leakage of glass batch, may necessitate use of guarding, and/or may require synchronization between the multiple side-mounted actuators. The presently disclosed batch inlet and cleaning device has a top-mounted actuator that represents one improvement, among others, over such prior devices.

Figure 1:
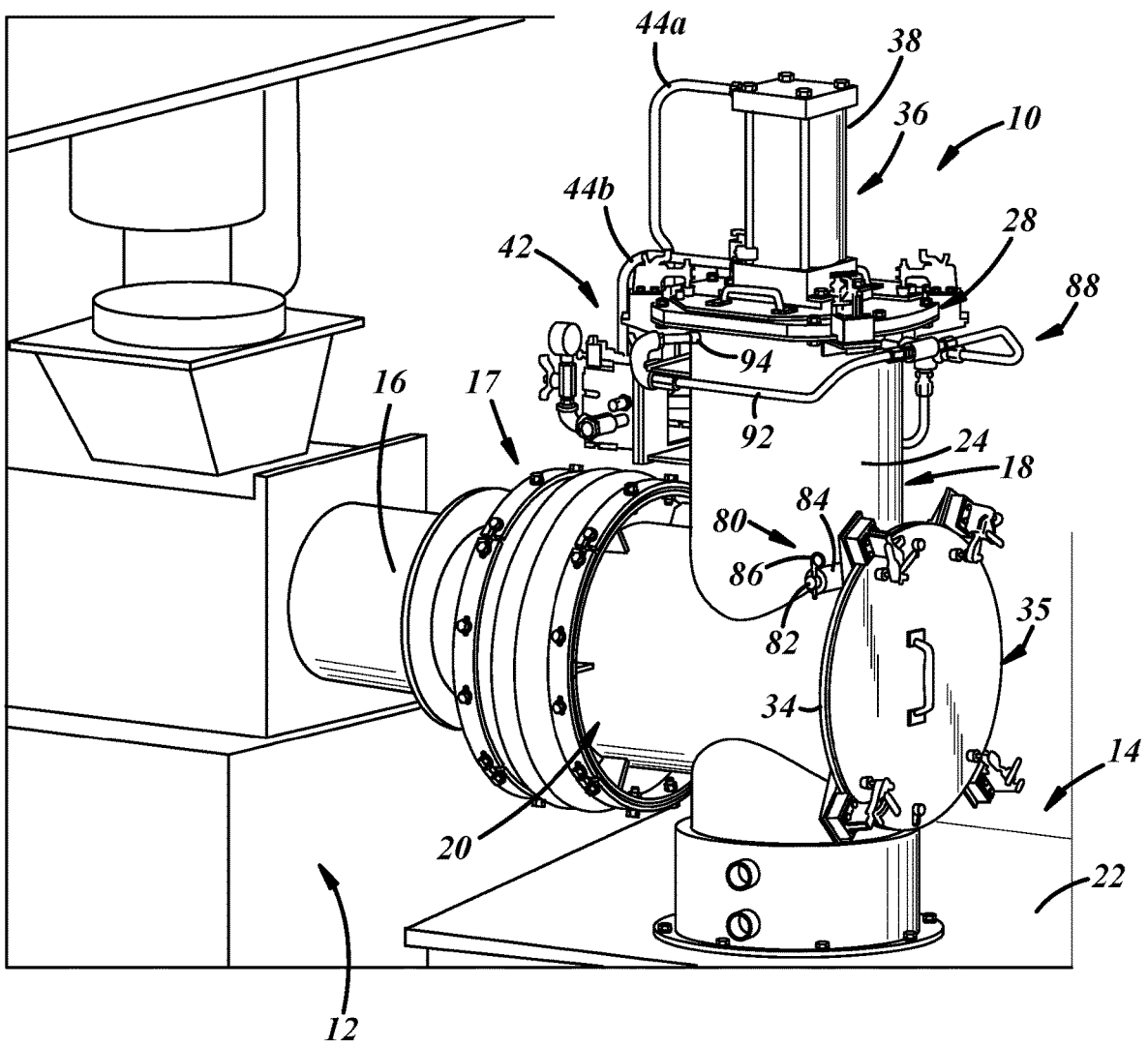
FIG. 1 is a fragmentary perspective view of a glass batch charger, a glass melter, and a glass batch inlet and cleaning device that conveys glass batch from the glass batch charger to the glass melter in accordance with an illustrative embodiment of the present disclosure.

With reference now specifically to the drawing figures, FIG. 1 illustrates an exterior view of a glass batch inlet and cleaning device 10 in accordance with an illustrative embodiment of the present disclosure. The device 10 is positioned between a batch charger 12 and a glass melter 14. The batch charger 12 has a charger outlet 16 that may include a conduit extending along a longitudinal axis that may be horizontally oriented to deliver glass batch horizontally across and into an outer tubular housing 18 of the device 10 via a side inlet 20 of the housing 18. The housing 18 has an upper end and a lower end and may extend therebetween along a longitudinal axis that may be vertically oriented to deliver glass batch vertically down and into the glass melter 14. The terms horizontally and vertically are used to define directions relative to gravity but do not mandate perfectly horizontal and perfectly vertical directions; rather, the terms encompass reasonable deviation from perfectly horizontal and perfectly vertical. For example, the charger outlet 16 and the housing 18 may be positioned, oriented, and/or otherwise configured such that an angle between the longitudinal axes of the charger outlet 16 and the housing 18 may range from 60° and 120° or, more narrowly, from 80° to 100°, while in some embodiments the angle may be about be 90° (i.e., 87° to 93°).

The side inlet 20 may be of tubular configuration, coupled to and transversely intersecting the tubular housing 18 in communication therewith, and coaxial with the charger outlet 16. The charger outlet 16 may be carried radially within the side inlet 20 and may be sealed thereto via a seal coupling 17, or may be coupled to the side inlet 20 in any other manner suitable to convey glass batch. The batch charger 12 delivers the glass batch through the charger outlet 16, into and through the device 10 via the side inlet 20 and housing 18, through a top wall or roof 22 of the melter 14, and down into an interior of the melter 14.

Figure 2A:
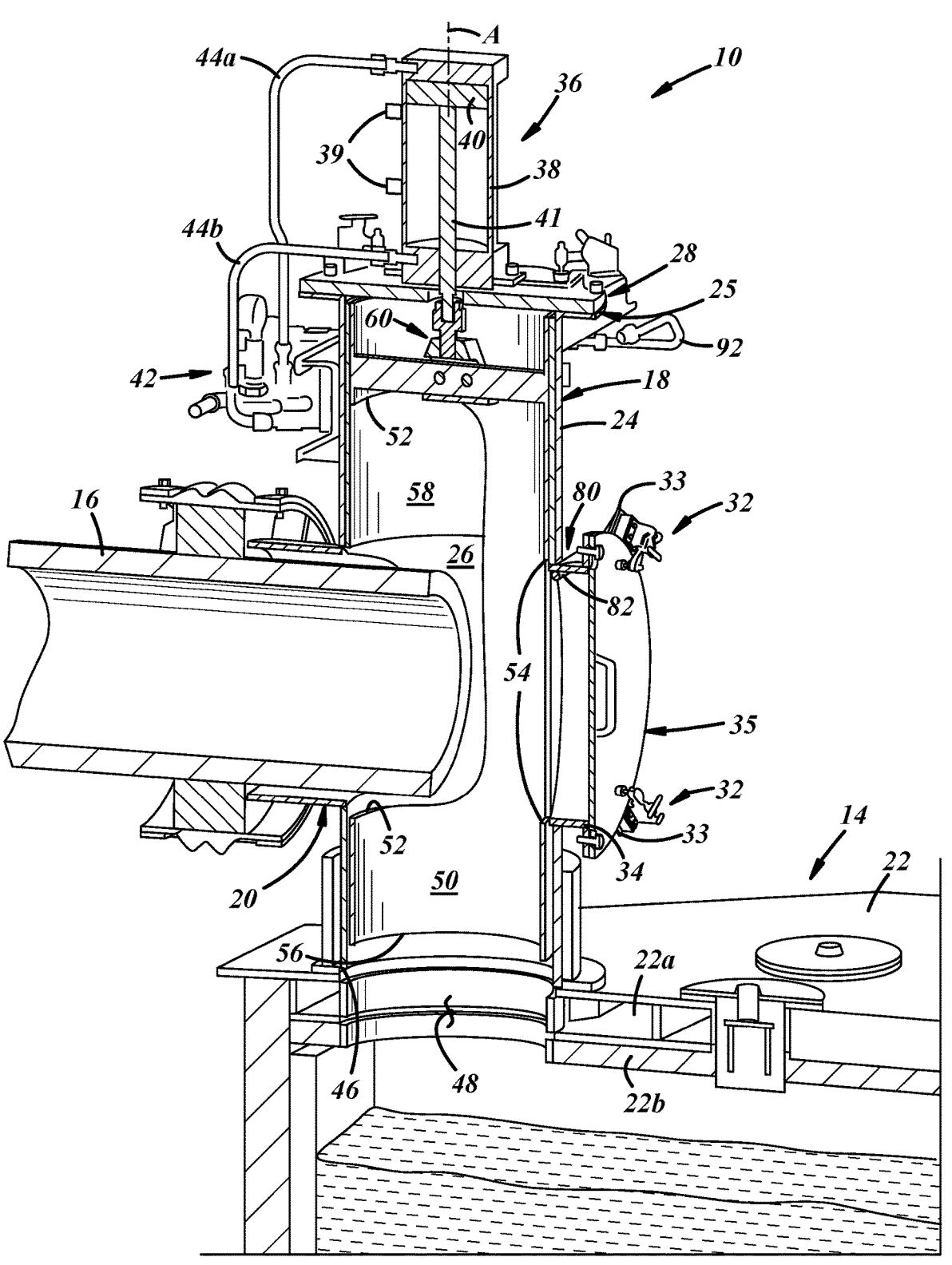
FIG. 2A is a fragmentary, longitudinal sectional view of the batch inlet and cleaning device and portions of the glass batch charger and glass melter of FIG. 1, and illustrating a chopper of the device in a retracted position.

As shown best in FIG. 2A, the housing 18 has an outer wall 24 that forms an interior 26 of the tubular housing 18, and the glass batch passes from the side inlet 20 into the interior 26 of the tubular housing 18. The outer wall 24 extends from the upper end of the housing 18 to the lower end of the housing 18. A cover 28 at the upper end of the housing 18 obstructs the glass batch from rising from the interior 26 up and out of the housing 18. The cover 28 may be coupled to a transversely extending flange 25 that protrudes radially outwardly from a top end of the outer wall 24 of the housing 18, for instance, via fasteners as shown, or via welding, clamping, or in any other suitable manner. In the illustrated embodiment, the cover 28 is a component separate from the housing 18 that is coupled to the housing 18 but, in other embodiments, those of ordinary skill in the art would recognize that the cover 28 can be, or can include, one or more integral portions of the housing 18 such as a transversely extending wall or any other suitable portion(s) of the housing 18.

Figure 3:
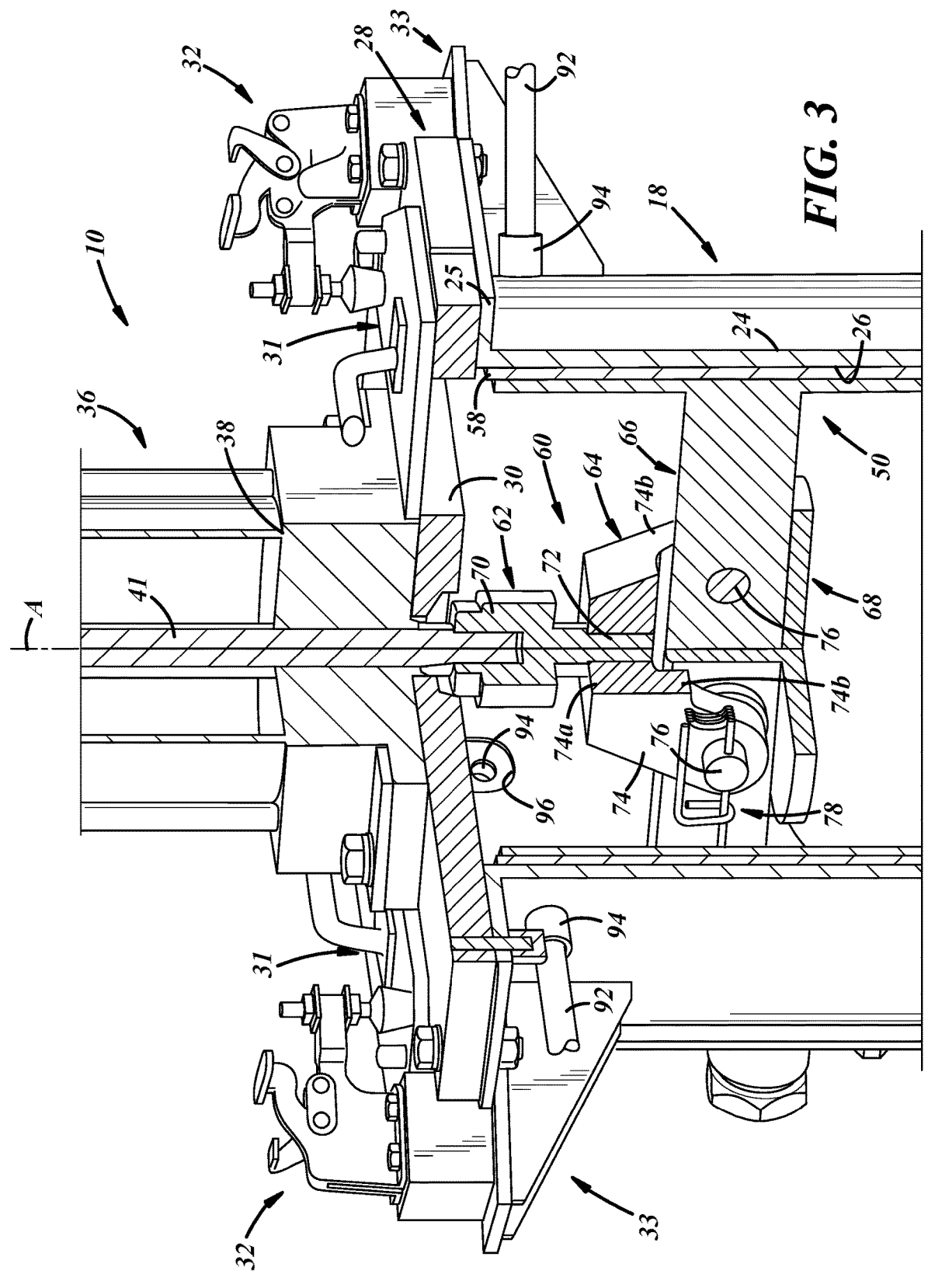
FIG. 3 is an enlarged, fragmentary, quarter-sectional, perspective view of a portion of the batch inlet and cleaning device of FIG. 1, illustrating a coupling between an actuator and the chopper.

With reference now to FIG. 3, the cover 28 may include one or more upper viewing ports 30 through which the charger outlet 16 and/or the side inlet 20 (FIG. 2A) and other internal components of the device 10 are viewable. Also, molten glass within the melter 14 (FIG. 1) can be viewed through the upper viewing ports 30. The upper viewing ports 30 can be covered with port covers 31 that may be quickly and easily removed for viewing and/or accessing the interior 26. The port covers 31 can be solid plates with handles that close and protect the upper viewing ports 30 when not being used. The port covers 31 can be releasably coupled to the cover 28, for example, via clamps 32 that may be carried on supports 33 that may be coupled to the wall 24 of the tubular housing 18. For example, the supports 33 may include weldments welded to the wall 24 of the tubular housing 18 and spacer blocks carried on the weldments in any suitable manner. The upper viewing ports 30 can include mere openings in the cover 28, or a transparent material like glass, for viewing the internal components of the device 10, and/or can be at least partially formed of a mesh for protecting the internal components of the device 10 from debris and/or the like while still allowing viewing. Additionally, the upper viewing ports 30 can be used by an operator to observe the introduction of batch into the device 10 or to observe the operation of the device 10 without danger of being pinched or otherwise hurt by movement of various other components of the device 10. Although only one upper viewing port 30 is shown in FIG. 3, at least one other viewing port may be provided, for example, diametrically opposite therefrom.

With reference again to FIG. 2A, the device 10 also includes a side cleanout port 34, through which the interior 26 of the device 10 is accessible. The side cleanout port 34 may be of tubular configuration, coupled to and transversely intersecting the housing 18 in communication therewith, and may be coaxial with the side inlet 20. The side cleanout port 34 can be opened to allow an operator to access, clean, view, and/or take samples (e.g., of the glass batch) from the interior 26. The side cleanout port 34 can be covered with a port cover 35 that may be quickly and easily removed for viewing and/or accessing the interior 26. The port cover 35 can be a solid plate with a handle, to close and protect the side cleanout port 34 when not being used. The port cover 35 can be releasably coupled to the port 34, for example, via additional instances of the clamps 32 that, again, may be carried by spacer blocks on supports 33 that may be coupled to the wall 24 of the tubular housing 18 via weldments or the like.

With reference to FIGS. 1 and 2A, the device 10 also includes an actuator 36 positioned on top of and carried by the cover 28, such that the actuator 36 may be a top-mounted actuator. The actuator 36, for example, may be coupled to the cover 28 via fasteners as shown in the illustrated embodiment, or in any other manner suitable for use in a glass melting environment. The actuator 36 imparts movement to internal components of the device 10, as will be discussed herein below. Notably, the actuator 36 does not necessitate the use of guarding.

The actuator 36 may include a pneumatic or hydraulic cylinder or housing 38 and a piston 40 carried in the cylinder, and may be in fluid communication with one or more fluid control valves 42, via an actuation line 44a and a retraction line 44b. The actuator 36 also may include an armature 41, which, in the illustrated embodiment, may include a piston rod coupled to the piston 40. Additionally, the actuator 36 may include one or more integrated proximity switches 39 (e.g., reed switches) to sense when the piston 40 (and, thus, the armature 41) is either in the fully up or fully down position. Although the illustrated actuator 36 may be a fluid-type actuator, the actuator 36 can include any actuator suitable to create movement, including electrical actuators, magnetic actuators, electromechanical actuators, etc. The actuator 36 can include an energy source that is electric, pneumatic, hydraulic, and/or mechanical to cause motion. Motion of the actuator 36 may be brought about when the actuator 36 receives a control signal, working fluid, and/or the like.

With continued reference to FIG. 2A, the device 10 includes an outlet 46 in communication with an inlet 48 of the glass melter 14. More specifically, the outlet 46 may be defined by the lower end of the tubular housing 18, for instance, a bottom end of the outer wall 24 of the housing 18, such that the cover 28 is coupled to the housing 18 opposite of the outlet 46. Likewise, the inlet 48 of the glass melter 14 may be a passage through the roof 22 of the melter 14. The melter roof 22 may include a fluid cooled outer portion 22a and a refractory inner portion 22b carried by the outer portion 22a in any suitable manner.

Figure 2B:
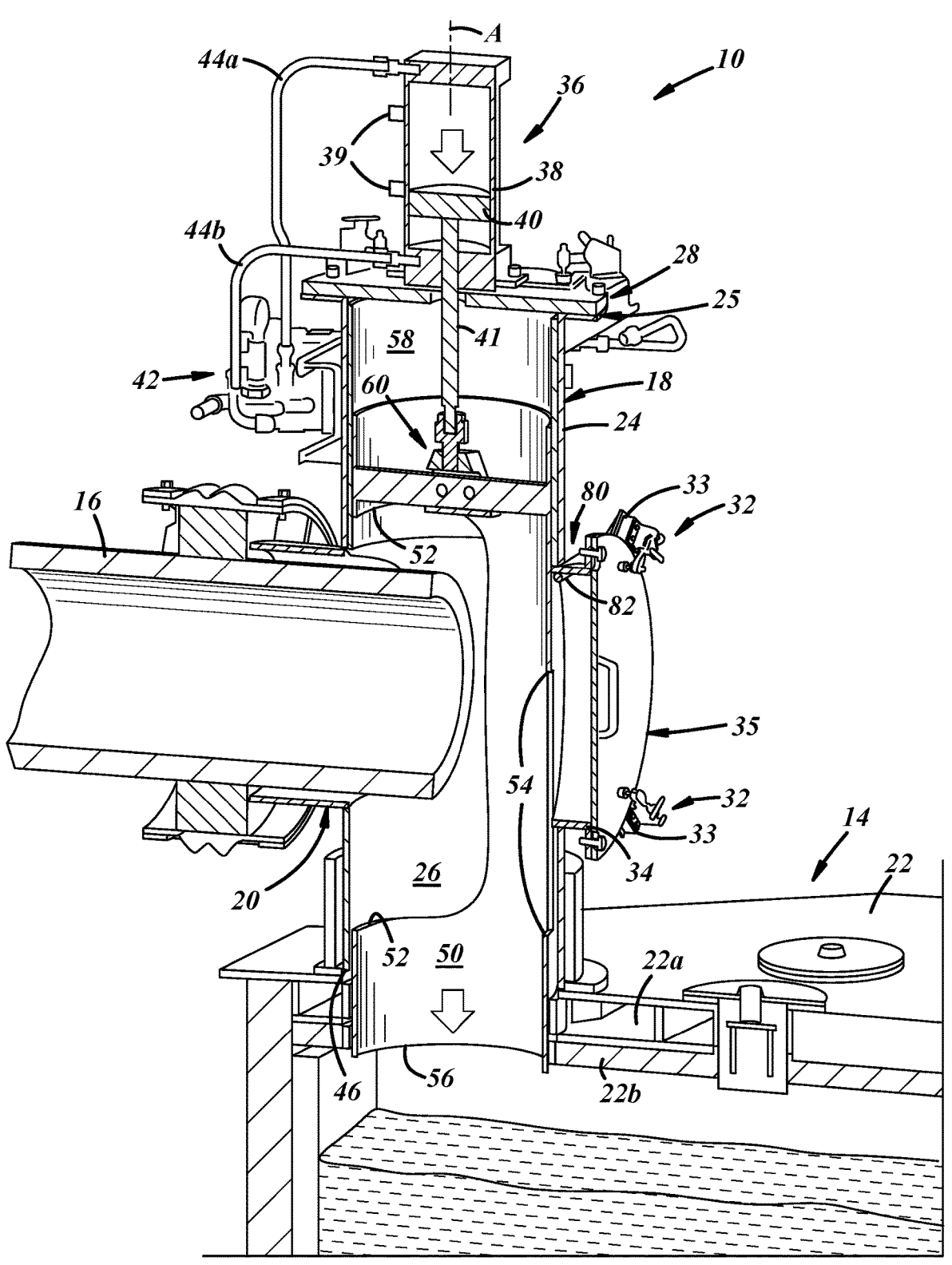
FIG. 2B is the device shown in FIG. 2A, illustrating the chopper in an advanced position.

With reference now to both FIGS. 2A and 2B, the device 10 also includes an inner tubular chopper 50 to clear solidified or frozen glass from the outlet 46 of the device 10 and the inlet 48 of the furnace 14. The chopper 50 is hollow so that glass batch can flow therethrough and is shaped to fit and is slidable within the housing 18. The chopper 50 is also configured to accommodate extension of the charger outlet 16 through the side inlet 20 and cleaning of the charger outlet 16 through the cleanout port 34. For example, the chopper 50 includes a side inlet relief 52 in registration with the side inlet 20 of the housing 18. The chopper 50 also may include a side cleanout relief 54 in registration with the side cleanout port 34 of the housing 18. Thus, the shape of the reliefs 52, 54 may correspond to the shape of the side inlet 20 and the side cleanout port 34 so that the side inlet 20 and the side cleanout port 34 will fit within or otherwise register with respect to the respective reliefs 52, 54, and so that the reliefs 52, 54 can move relative to both of the side inlet 20 and the side cleanout port 34 as the chopper 50 is actuated.

One or both of the reliefs 52, 54 may be rectangular with rounded corners and formed around the circumference of the chopper 50. Correspondingly, the side inlet 20 and the side cleanout port 34 may include a cylindrical or tubular portion, with a circular cross-section, so that these cylindrical components can fit within the reliefs 52, 54 of the chopper 50. More specifically, the chopper 50, which includes the reliefs 52, 54, can slide up and down while the side inlet 20 and the side cleanout port 34 remain stationary. In FIG. 2A, the side inlet 20 is proximate a lower portion of the relief 52 while the tubular chopper 50 is in a first or raised position relative to the housing 18. Contrastingly, in FIG. 2B, the side inlet 20 is proximate an upper portion of the relief 52 while the tubular chopper 50 is in a second or lowered position relative to the housing 18. The charger outlet 16 is visible through the side cleanout port 34 when the chopper 50 is retracted and can be cleaned out when the cover 35 of the side cleanout port 34 is removed.

The chopper 50 has a chopping end 56 that may be circular or ring-shaped and that breaks or removes solidified glass from the inner surfaces of the device 10. Specifically, FIG. 2A depicts a first or rest position of the chopping end 56 of the chopper 50, and FIG. 2B depicts a second or actuated position of the chopping end 56 of the chopper 50. When the chopper 50 is in its raised position and the chopping end 56 is in its corresponding first or raised position, the chopping end 56 is maintained within the housing 18. And when the chopper 50 is actuated to its lowered position, and the chopping end 56 is moved to its corresponding second or lowered position, the chopping end 56 is extended out of the housing 18 and through the outlet 46. In this way, the chopping end 56 removes or chops any glass that is obstructing the outlet 46 as the chopping end 56 is driven from its first position to its second position past the outlet 46 of the device 10. The chopping end 56 is moved linearly within the housing 18 and may be shaped to correspond to an inner dimension of the outlet 46 so that, once actuated, no frozen glass can remain blocking the outlet 46.

The device 10 also may include a guide bushing 58 disposed between the housing 18 and the chopper 50 to guide movement of the chopper 50 within the housing 18. In the illustrated embodiment, the guide bushing 58 extends between the side inlet 20 and the cover 28 and terminates at the upper end of the side inlet 20. In other embodiments, the guide bushing 58 could extend between the lower end of the side inlet 20 and the outlet 46, but it is preferable that it does not to avoid undesirable debris build up and tightness of the chopper 50 in that region. In any case, the guide bushing 58 may facilitate good centering or alignment of the chopper 50 relative to the housing 18 during operation of the chopper 50. The guide bushing 58 may be composed of a bronze material, and may be press or interference fit into the housing 18 against the outer wall 24 and/or may be plug or tack welded to the outer housing 18.

The actuator 36 may be arranged coaxially with respect to the chopper 50 along a chopper longitudinal axis A to centrally apply actuation force to the chopper 50 from above. A "centrally" applied actuation force refers to a force that is applied centrally to the chopper 50, as opposed to a side of the chopper 50, and in that sense the actuator 36 applies an actuation force to the chopper 50 along the chopper longitudinal axis A. When the actuator 36 is energized in a first direction, the actuator 36 drives the piston 40 downwards and moves the chopper 50 along the chopper longitudinal axis A from the raised position to the lowered position, thus sliding the chopping end 56 of the chopper 50 from the first position within the housing 18 to the second position outside of the housing 18 and beyond the outlet 46 of the device 10. When the actuator 36 is energized in a second direction opposite from the first direction, the actuator 36 drives the piston 40 upwards and moves the chopper 50 along the chopper longitudinal axis A from the lowered position and returns the chopper 50 to the raised position, thus sliding the chopping end 56 of the chopper 50 from the second position outside of the housing 18 and beyond the outlet 46 to the first position within the housing 18. For example, in a pneumatic actuator embodiment, the actuator 36 includes a fluid circuit that applies fluid on one side of the piston 40 through actuation line 44a, and then on an opposite side through retraction line 44b, in an alternating manner to reciprocate the chopper 50 up and down.

Referring now to FIG. 3, the actuator 36 may be coupled to other corresponding portions of the device 10, namely, the housing 18 and the chopper 50, in any suitable manner. The housing 38 of the actuator 36 may be coupled to the cover 28, for example, by fastening the housing 38 to the cover 28 with any suitable fasteners as illustrated, or may be clamped or welded thereto, or may be coupled thereto in any other suitable manner. The armature 41 of the actuator 36 may be coupled to the chopper 50 by a chopper coupling 60, which may be a floating coupling, or in any other suitable manner.

The coupling 60 of the illustrated embodiment includes a linear alignment coupler 62 coupled to the armature 41, a clevis 64 coupled to the linear alignment coupler 62, one or more chopper arm(s) 66 coupled to the chopper 50 and coupled to the clevis 64, and a splash guard 68 that may be coupled to a lower end of the chopper arms 66. The linear alignment coupler 62 includes a receptacle end 70 that may be threaded or otherwise coupled to the free end of the armature 41 and an extension end 72 that may be threaded or otherwise coupled to the clevis 64. The extension end 72 and the receptacle end 70 of the coupler 62 may be parts of separate components assembled together with built in float or play to permit angular misalignment therebetween. The clevis 64 includes a multi-pin clevis bracket 74 including a base 74a that may be threaded or otherwise coupled to the extension end 72 of the linear alignment coupler 62 and a forked portion 74b extending away from the base 74a. The clevis 64 also includes at least two clevis pins 76 extending through corresponding passages in the forked portion 74b of the clevis bracket 74 and through corresponding passages in the one or more chopper arms 66. The clevis 64 further includes corresponding clevis keys 78 coupled to ends of the clevis pins 76, for example, via shaft portions extending through transverse holes through the ends of the clevis pins 76. The clevis keys 78 may have a safety-pin type of construction to mitigate loosening of the keys 78 due to vibration during operation of the device 10. The one or more chopper arms 66 may be one continuous arm extending radially inwardly from a tubular wall of the chopper 50 diametrically across the interior of the chopper 50. The chopper arm(s) 66 may be fastened, interference fit, welded, or otherwise coupled to the chopper 50. The splash guard 68 may include a round flat plate as illustrated, or guarding of any suitable shape and configuration that mitigates splashing of glass or debris up onto or past the components of the coupling 60.

Referring back to FIGS. 2A and 2B, as the actuator 36 is activated to move the chopper 50 up and down along the chopper longitudinal axis A between the raised and lowered positions, the chopper 50 might have a propensity to rotate within the tubular housing 18. To prevent such rotation, the device 10 may include a chopper anti-rotational coupling 80. As illustrated in the drawing figures, an embodiment of the anti-rotational coupling 80 includes a secant bar 82 extending through a portion of the side cleanout port 34.

Figure 4:
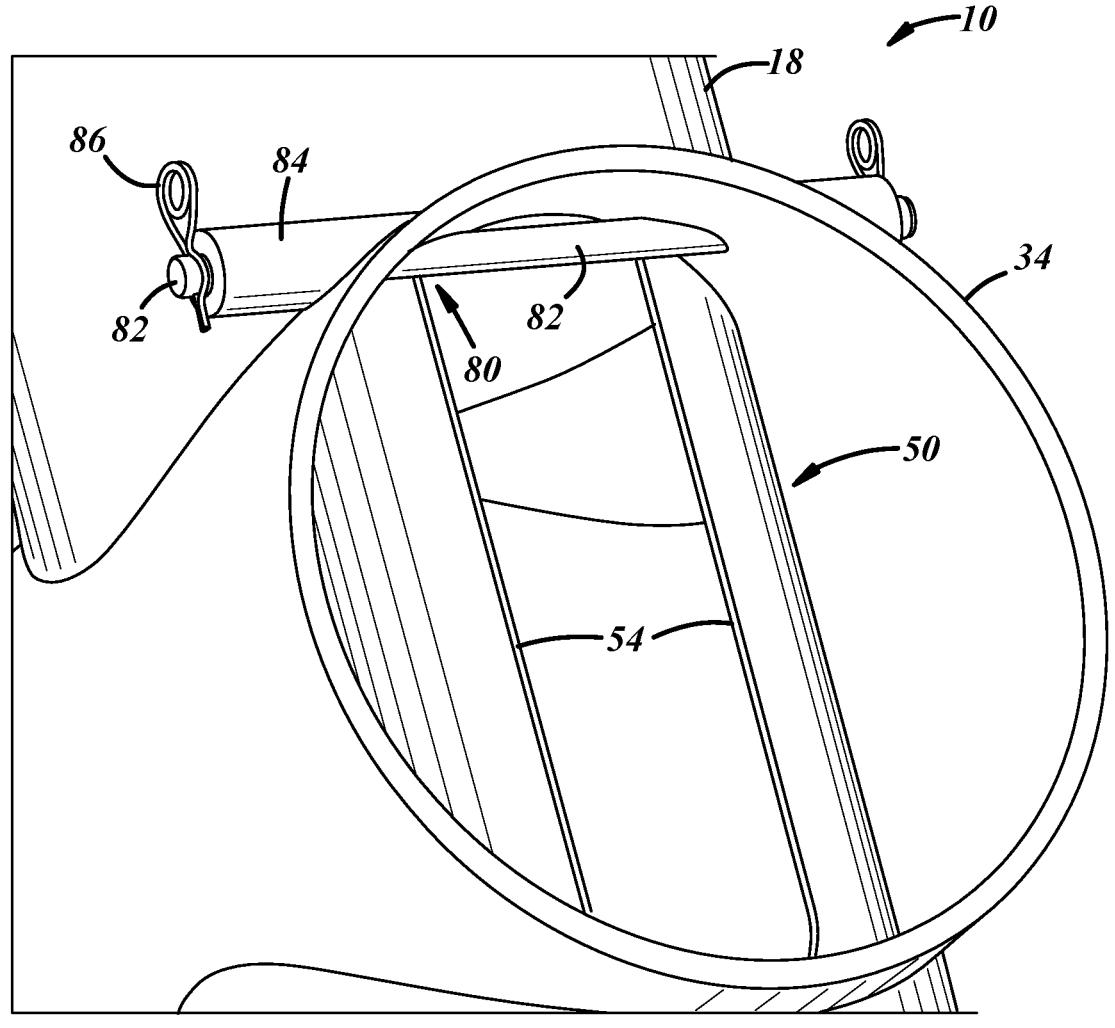
FIG. 4 is an enlarged, fragmentary, perspective view of a chopper anti-rotational feature of the batch inlet and cleaning device of FIG. 1.

Referring now to FIG. 4, the secant bar 82 engages longitudinally extending edges of the chopper 50 that partially establish the side cleanout relief 54 of the chopper 50. The secant bar 82 may be a cylindrical shaft carried in corresponding bosses 84 that may be welded or otherwise coupled to the housing 18 and/or to the side cleanout port 34, and may be retained thereto via one or more retainers 86, for example, retention clips, cotter pins, or any other suitable retainers. In an unillustrated embodiment, an anti-rotational coupling may include extensions of the chopper arm(s) 66 extending through corresponding slots (not shown) of the guide bushing 58 and the housing 18. Such an embodiment is certainly possible, but less desirable than the illustrated embodiment because it presents potential leak paths through the slots for batch material or debris and a need to braze weld the guide bushing 58 (FIG. 2A) to the housing 18 to retain the guide bushing 58 in place. In contrast, the illustrated embodiment does not involve unnecessary leak paths and the guide bushing 58 (FIG. 2A) does not have to be braze welded to the housing 18 but may, for instance be interference fit to the housing 18 to retain it thereto.

Figure 5:
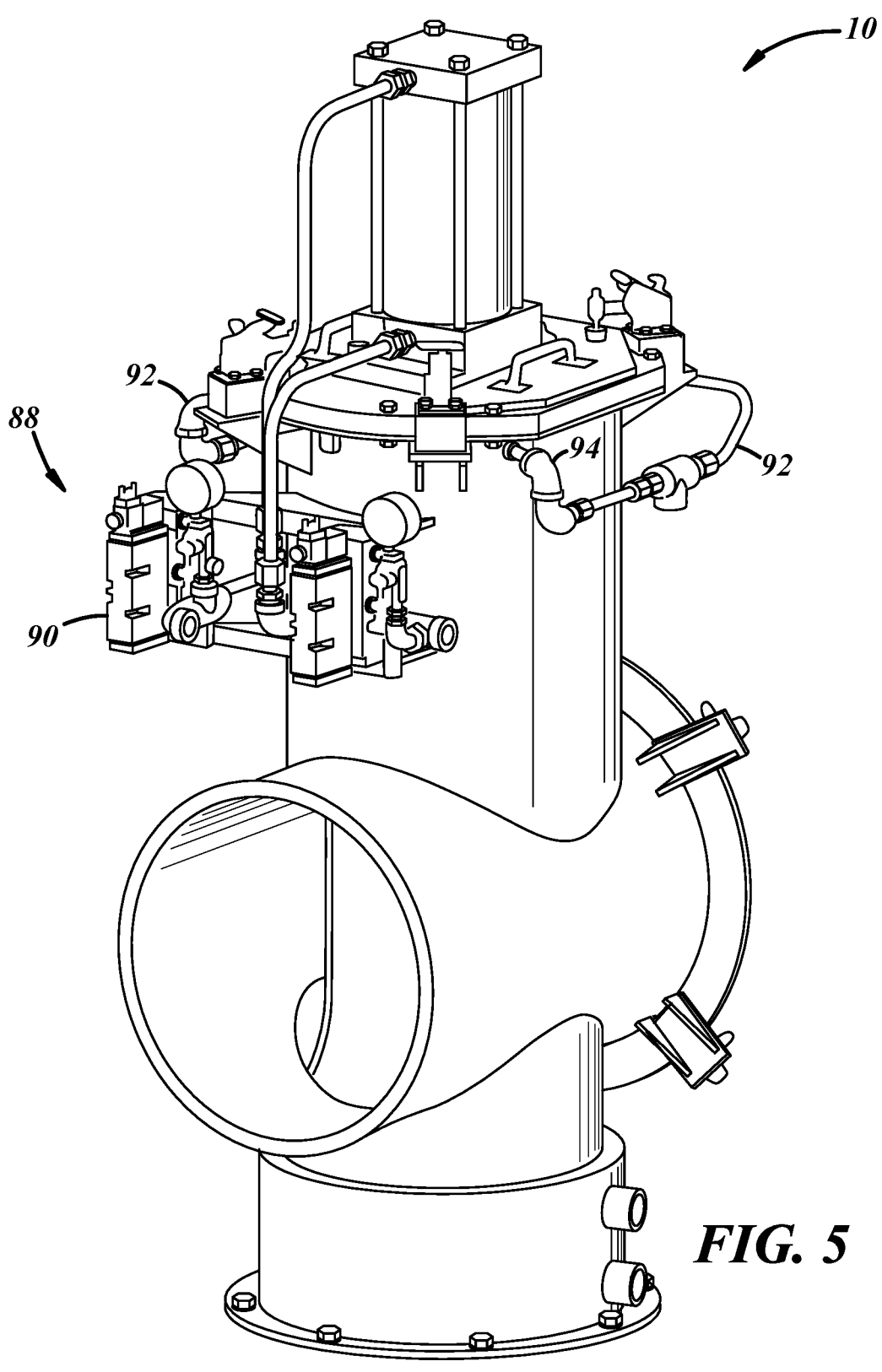
FIG. 5 is a perspective view of the device of FIG. 1, viewed from a different angle.

With reference now to FIGS. 1 and 5, the device 10 also may include a pneumatic supply system 88 to supply a gas, such as air, under pressure to an upper portion of the interior 26 of the device 10 above the side inlet 20 to thereby blow air over the coupling 60 and inhibit batch material or debris from rising upwards towards the cover 28 the device 10. The pneumatic supply system 88 may include a control valve 90 that receives air, for example, under pressure from a plant-wide air system, a local air compressor, or any suitable supply of pressurized air, and regulates flow of the air therefrom. One or more air supply conduits 92 are coupled to the control valve 90 to receive the flow of pressurized air therefrom and communicate it to one or more ports 94 that extend through the outer wall 24 of the housing 18 in the upper portion of the device 10. In the illustrated embodiment, there are one or more conduits 92 that supply one or more ports 94, which may be angularly spaced apart, equidistantly or otherwise. In the illustrated embodiment of FIG. 5, the control valve 90 and the conduits 92 are carried by the housing 18 of the device 10, for example, in a location above the side inlet 20. Likewise, in the illustrated embodiment of FIG. 1, the fluid control valve(s) 42, actuation line 44a, and retraction line 44b may be carried by the outer tubular housing 18 of the device 10, for example, in a location above the side inlet 20. Such equipment may be carried by one or more brackets, which may be welded, fastened, or otherwise coupled to the housing 18 in any suitable manner. To accommodate the ports 94 in the housing 18, upper ends of the guide bushing 58 and/or the chopper 50 may be scalloped or otherwise relieved to include port reliefs 96 to freely register with the ports 94, as shown in FIG. 3.

In operation, and with reference to FIGS. 2A and 2B, a method of using the device 10 includes passing glass batch through the device 10 and into the melter 14. Specifically, as described above, the glass batch may be delivered by the batch charger 12 and into the interior 26 of the housing 18 through the side inlet 20. The glass batch then falls through the interior 26 of the housing 18 and through the outlet 46 of the device 10. The glass batch ultimately enters the glass melter 14 through the melter inlet 48 after it exits the device 10 through the outlet 46. Over time, molten glass from the glass melt contained within the melter 14 may splash up around and into the inlet 48, and solidify such that glass impedes delivery of glass batch from the device 10 into the melter 14, potentially even clogging the inlet 48 entirely.

In that regard, the method also includes activating the actuator 36 to actuate the chopper 50 from the raised position (FIG. 2A), in which the chopping end 56 of the chopper 50 is maintained in the housing 18 at the first position, to the lowered position (FIG. 2B), in which the chopping end 56 extends out of the housing 18 and through the outlet 46 to the second position to clear solidified glass from the outlet 46 and any adjacent components of the device 10 and the melter 14. In this way, glass batch can continue to be fed unobstructed to the melter 14, and the melter 14 can continue to produce molten glass. In other words, after solidified glass that is impeding glass batch flow is mechanically cleared, and glass batch continues to be delivered from the batch charger 12, though the device 10, and into the melter 14, without any stoppage or reduction in the glass batch flow rate. The chopper 50 can be actuated on demand, for example when the glass batch solidifies at the outlet 46 in order to clear the solidified glass batch from the outlet 46, and/or at a periodic interval or specific time point. The chopper 50 can be actuated automatically, manually, or some combination of the two.

As used in herein, the terminology "for example," "e.g.," "for instance," "like," "such as," "comprising," "having," "including," and the like, when used with a listing of one or more elements, is to be construed as open-ended, meaning that the listing does not exclude additional elements. Also, as used herein, the term "may" is an expedient merely to indicate optionality, for instance, of a disclosed embodiment, element, feature, or the like, and should not be construed as rendering indefinite any disclosure herein. Finally, the subject matter of this application is presently disclosed in conjunction with several explicit illustrative embodiments and modifications to those embodiments, using various terms. All terms used herein are intended to be merely descriptive, rather than necessarily limiting, and are to be interpreted and construed in accordance with their ordinary and customary meaning in the art, unless used in a context that requires a different interpretation. And for the sake of expedience, each explicit illustrative embodiment and modification is hereby incorporated by reference into one or more of the other explicit illustrative embodiments and modifications. The present disclosure is intended to embrace all such embodiments and modifications of the subject matter of this application, and equivalents thereto, as fall within the broad scope of the accompanying claims.

The invention claimed is:

1. A glass batch inlet and cleaning device, comprising:
an outer tubular housing including a side inlet;
an inner tubular chopper slidable within the outer tubular housing;
a cover on the outer tubular housing; and
an actuator carried by the cover and coupled to the inner tubular chopper to move the chopper with respect to the outer tubular housing.

2. The device set forth in claim 1, wherein the inner tubular chopper includes a side inlet relief in registration with the side inlet of the outer tubular housing.

3. The device set forth in claim 2, wherein the outer tubular housing includes a side cleanout port through which an interior of the device is accessible, and wherein the inner tubular chopper includes a side cleanout relief in registration with the side cleanout port of the outer tubular housing.

4. The device set forth in claim 3, further comprising a secant bar carried by the outer tubular housing, and engaged against longitudinally extending edges of the inner tubular chopper that partially establish the side cleanout relief of the inner tubular chopper, to prevent rotation of the inner tubular chopper.

5. The device set forth in claim 1, wherein the outer tubular housing has an outlet, and the inner tubular chopper has a chopping end and is moveable relative to the outer tubular housing between a raised first position in which the chopping end is positioned within the outer tubular housing and a lowered position in which the chopping end extends out of the outer tubular housing beyond the outlet.

6. The device set forth in claim 5, wherein the inner tubular chopper includes at least one arm extending radially inwardly from a wall of the inner tubular chopper, and wherein the actuator comprises an armature coupled to the at least one arm, wherein the armature is drivable down to move the inner tubular chopper from the raised first position to the lowered position.

7. The device set forth in claim 6, further comprising a floating coupling between the armature and the at least one arm of the inner tubular chopper.

8. The device set forth in claim 7, wherein the floating coupling includes a linear alignment coupler coupled to a free end of the armature, and a clevis coupled to the linear alignment coupler and to the at least one arm of the inner tubular chopper.

9. The device set forth in claim 1, further comprising at least one fluid control valve coupled to the actuator via actuation and retraction lines to control movement of the inner tubular chopper with respect to the outer tubular housing.

10. The device set forth in claim 1, wherein the actuator includes a pneumatic or hydraulic cylinder, a piston carried in the cylinder, an armature carried by the piston and coupled to the inner tubular chopper, and proximity switches carried by the cylinder to sense a position of the armature.

11. The device set forth in claim 1, further comprising a guide bushing radially between the outer tubular housing and the inner tubular chopper.

12. A glass batch inlet and cleaning device, comprising:

an outer tubular housing extending from an upper end to a lower end and including a side inlet, the lower end of the housing defining an outlet;

an inner tubular chopper including a side inlet relief in registration with the side inlet of the outer tubular housing;

a cover coupled to the upper end of the outer tubular housing opposite of the outlet; and an actuator carried by the cover and coupled to the inner tubular chopper to move the chopper with respect to the outer tubular housing.

13. The device set forth claim 12, further comprising a pneumatic supply system to supply gas under pressure to an interior of the outer tubular housing above the side inlet.

14. The device set forth in claim 13, wherein the pneumatic supply system includes at least one control valve and at least one conduit in fluid communication between the at least one control valve and at least one port that extends through the outer tubular housing.

15. A method of using a glass batch inlet and cleaning device, the method comprising:

providing a glass batch inlet and cleaning device that includes an outer tubular housing that defines an interior and an outlet from the device and that further includes a side inlet, the glass batch inlet and cleaning device also including an inner tubular chopper slidable within the outer tubular housing and a cover on the outer tubular housing;

passing glass batch through the glass batch inlet and cleaning device and into a glass melter, the glass batch being introduced into the interior of the outer tubular housing through the side inlet and then passing through the interior and out of the outlet of the housing and into the glass melter through an inlet of the glass melter; and activating an actuator carried by the cover and coupled to the inner tubular chopper to centrally actuate the chopper with respect to the outer tubular housing from a raised position, in which a chopping end of the chopper is within the outer tubular housing, to a lowered position, in which the chopping end extends out of the outer tubular housing and beyond the outlet.

16. The method set forth in claim 15, further comprising:

observing that the inlet of the glass melter or the outlet of the glass batch inlet and cleaning device is at least partially obstructed by glass from the glass melter; and wherein the step of activating the actuator is performed after observing that the inlet of the glass melter or the outlet of the glass batch inlet and cleaning device is at least partially obstructed by glass.

\* \* \* \* \*